Nov. 14, 1944.  S. RENSHAW  2,362,857
STEREO-DISPARATOR
Filed Dec. 22, 1941  6 Sheets-Sheet 1
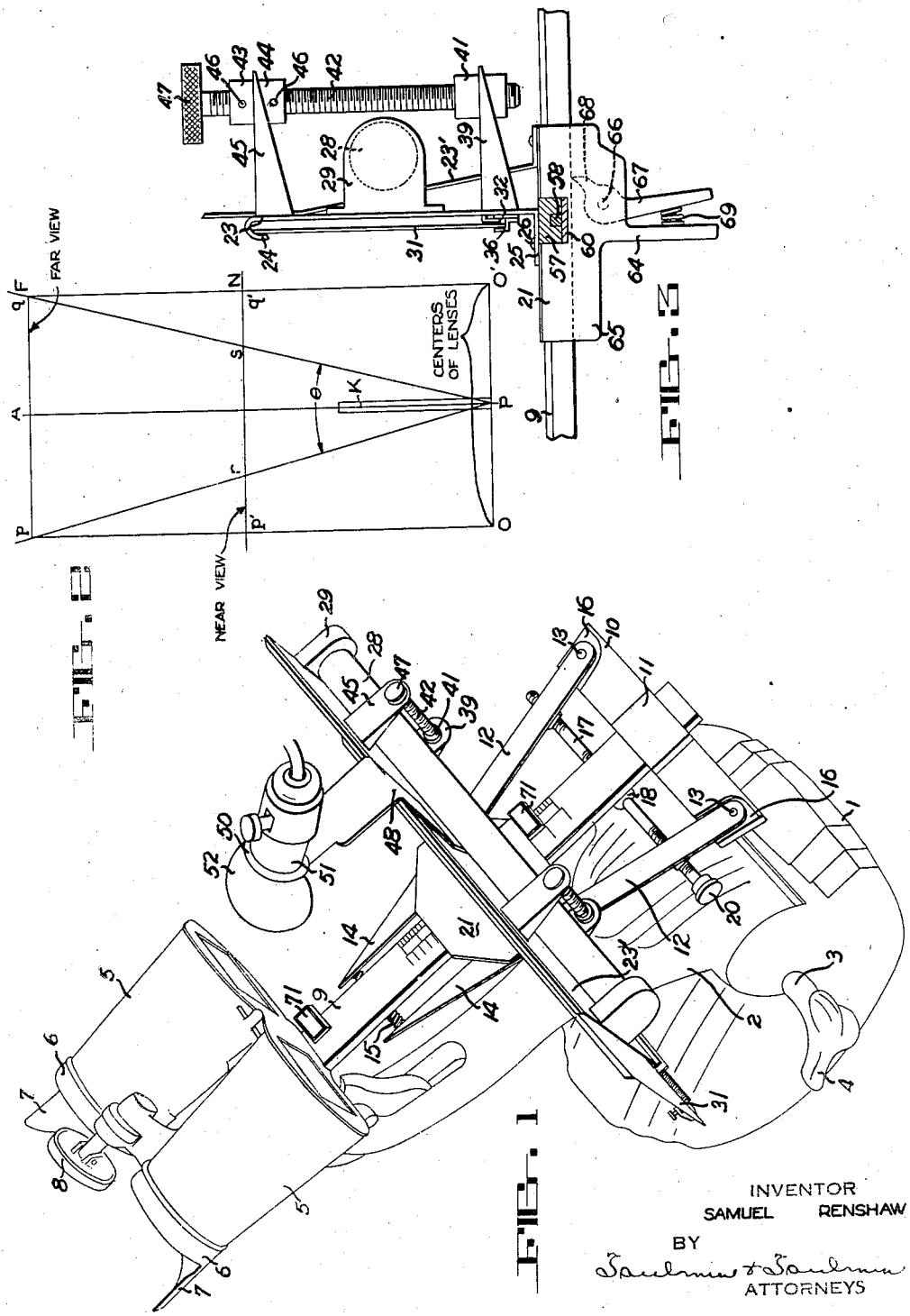
INVENTOR
SAMUEL RENSHAW
BY
ATTORNEYS

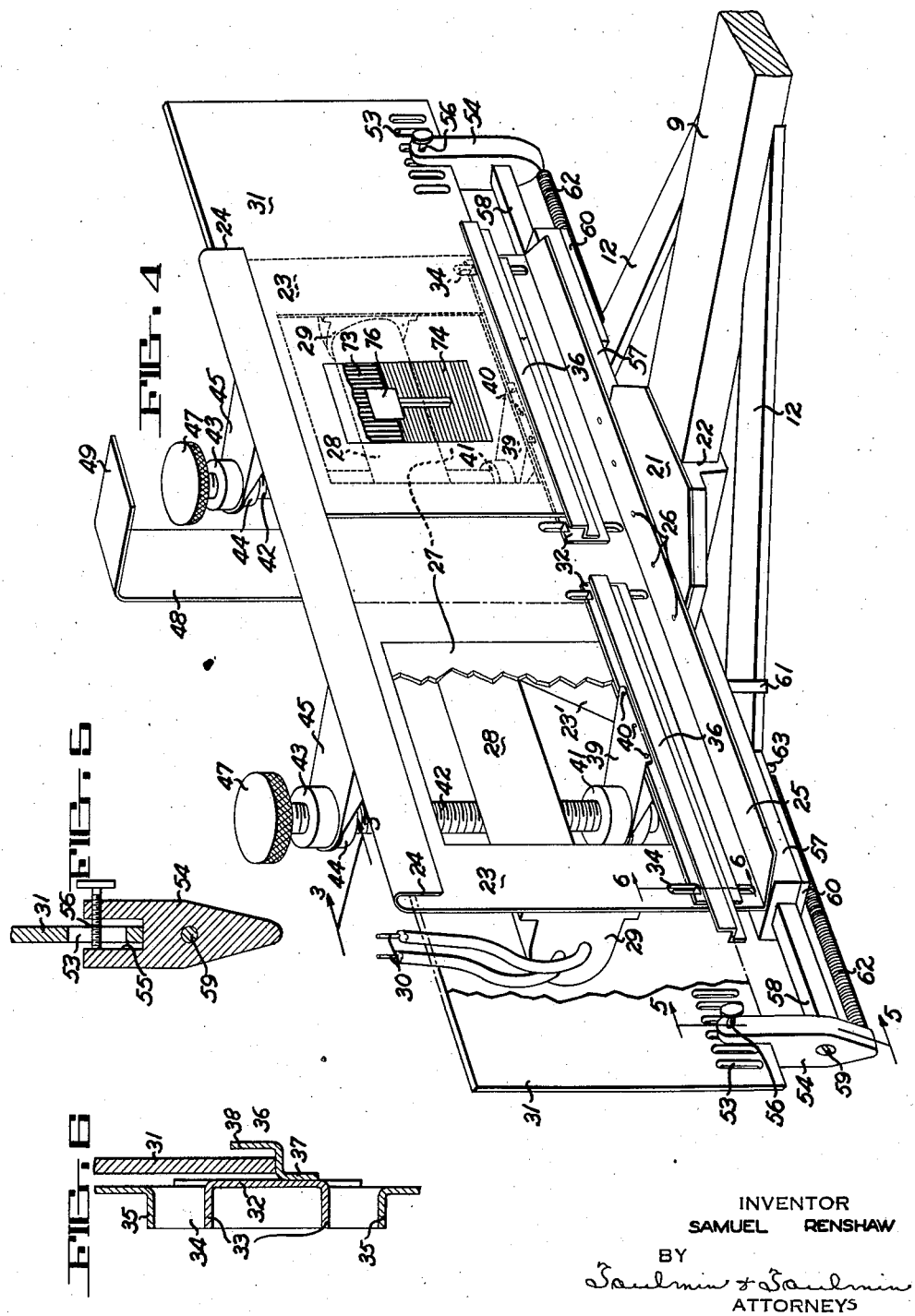

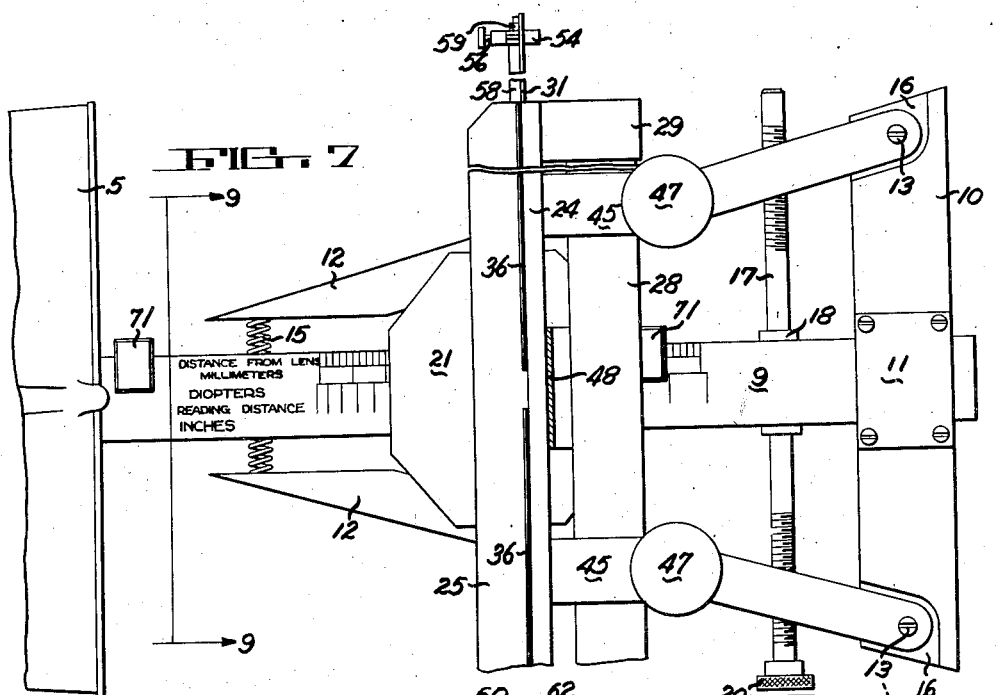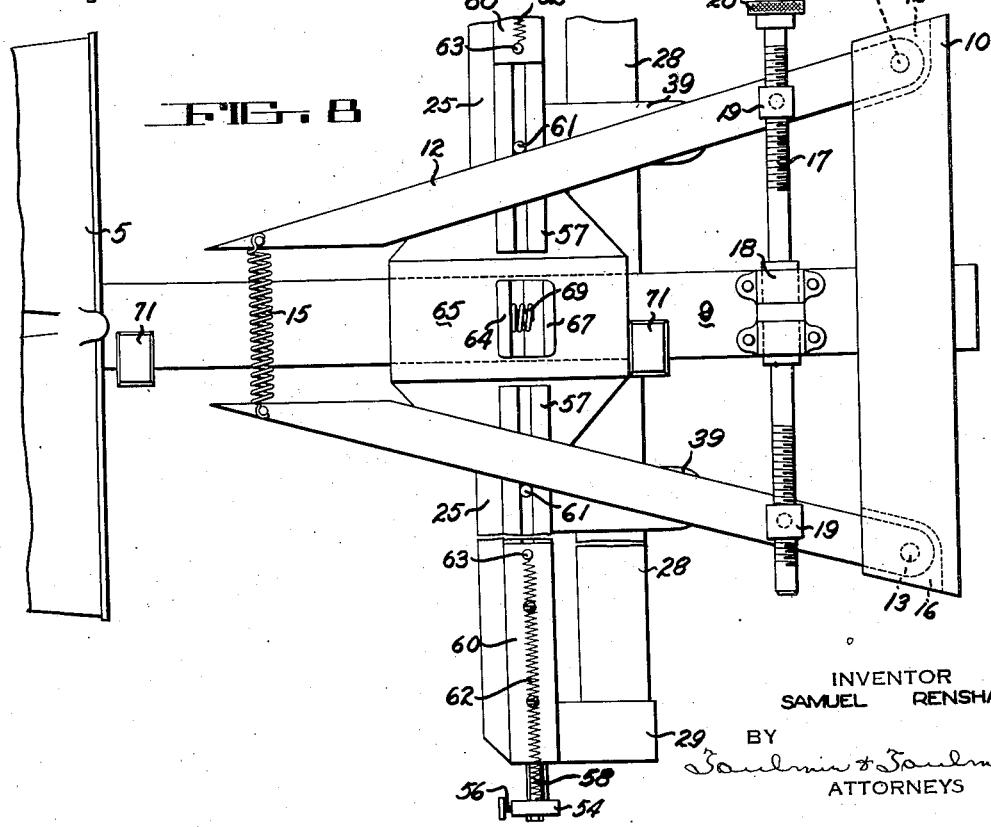

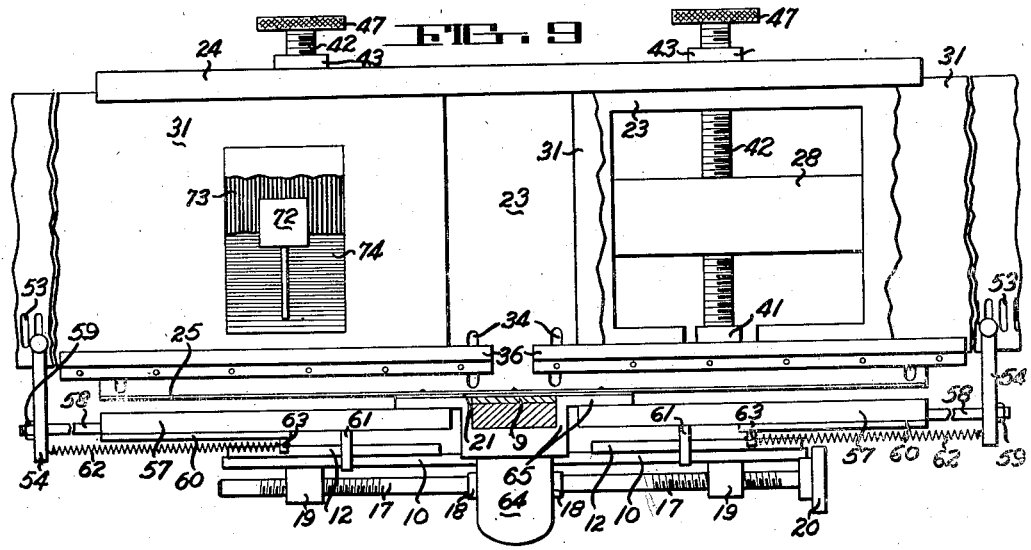

Patented Nov. 14, 1944

2,362,857

UNITED STATES PATENT OFFICE 2,362,857

STEREODISPARATOR

Samuel Renshaw, Columbus, Ohio, assignor to The Ohio State University Research Foundation, Columbus, Ohio, a corporation of Ohio Application December 22, 1941, Serial No. 424,001

15 Claims. (Cl. 88—20)

The present invention relates to methods of testing visual acuity and instruments for carrying out these methods, and more particularly to the examination of the eyes for refractive defects, excessive phoria, and conditions involving ocular image differences and departures from normal stereoscopic or tri-dimensional vision.

The primary object of the invention is to provide an improved method and apparatus for testing visual perception, particularly as applied to binocular or stereoscopic vision.

Another object is to provide improved methods and devices for determining vertical and lateral phorias so as to test the prismatic imbalance, both vertically and laterally, of a pair of eyes.

Still another object is to provide an instrument which is designed more especially for depth perception, and in which the stereoscopic result may be obtained in the form of a reading on a scale or scales, according to the adjustment of independent targets or viewing charts.

Another object is to provide an instrument, in which the stereoscopic pictures or charts are independently mounted as contrasted with a single mounting of the prior art.

A further object is to provide an improved instrument which presents to the two eyes, pairs of half-stereograms by means of which the correct optical positions in space for true stereopsis are attained.

Other objects are to provide an improved device which automatically produces a new, correct setting of these relations for attaining true stereopsis for each change in the focal length of the lens system; a device and methods for measuring the apparent size of objects, and of determining the size constancy index for any observer; an instrument of the character described which may be attached to any standard refracting head or turret or to any stereoscopic apparatus, thereby enabling an examiner to secure measurements of greater constancy and accuracy than are possible with the use of existing stereometric instruments, in which the target separations are held constant throughout the focal range; a means of measuring the limits in terms of the length of the principal focus of the lens system within which an observer can maintain single binocular three-dimensional vision; a device and methods for the orthoptic training and improving of stereoscopic visual skills and the measurement of the amount of such improvement; a device which when used with stereograms prepared according to the same principle may be used to measure perceptual form, position or visual apparent movement as well as apparent size.

Reference should now be made to the following description and the accompanying drawings.

In the drawings:

Figure 1 is a view looking down on the improved stereoscopic device.

Figure 2 is a diagram useful in explaining some of the principles on which the device operates.

Figure 3 is an end view of the device looking at about the position indicated by the line 3—3 (Figure 4) in the direction of the arrows.

Figure 4 is an enlarged perspective front and top view of the improved instrument, with the left-hand stereogram broken away to show in detail the elements at the rear.

Figure 5 is a cross sectional view of a clamping device provided at the outside lower edges of each stereogram for the purpose of moving the charts in a lateral direction, as will be explained hereinafter. This section is taken along the line 5—5 in Figure 4.

Figure 6 is a fragmentary sectional view, somewhat enlarged, of the slot and projection arrangement for guiding the charts in the vertical direction. This view is taken along the line 6—6 in Figure 4.

Figure 7 is a top plan view of the improved instrument, and Figure 8 is a bottom view.

Figure 9 shows a front view of the instrument, looking at about the position of the line 9—9 in Figure 7.

Figure 10 depicts a chart on which a number of phenomenal areas appear, indicated as rectangles, which chart may be used in determining defects of stereoscopic vision.

Figure 11 is a graph by which the determinations found in the laboratory and employing the improved instrument may be translated into field test measurements.

The principle of the invention

Figure 12:
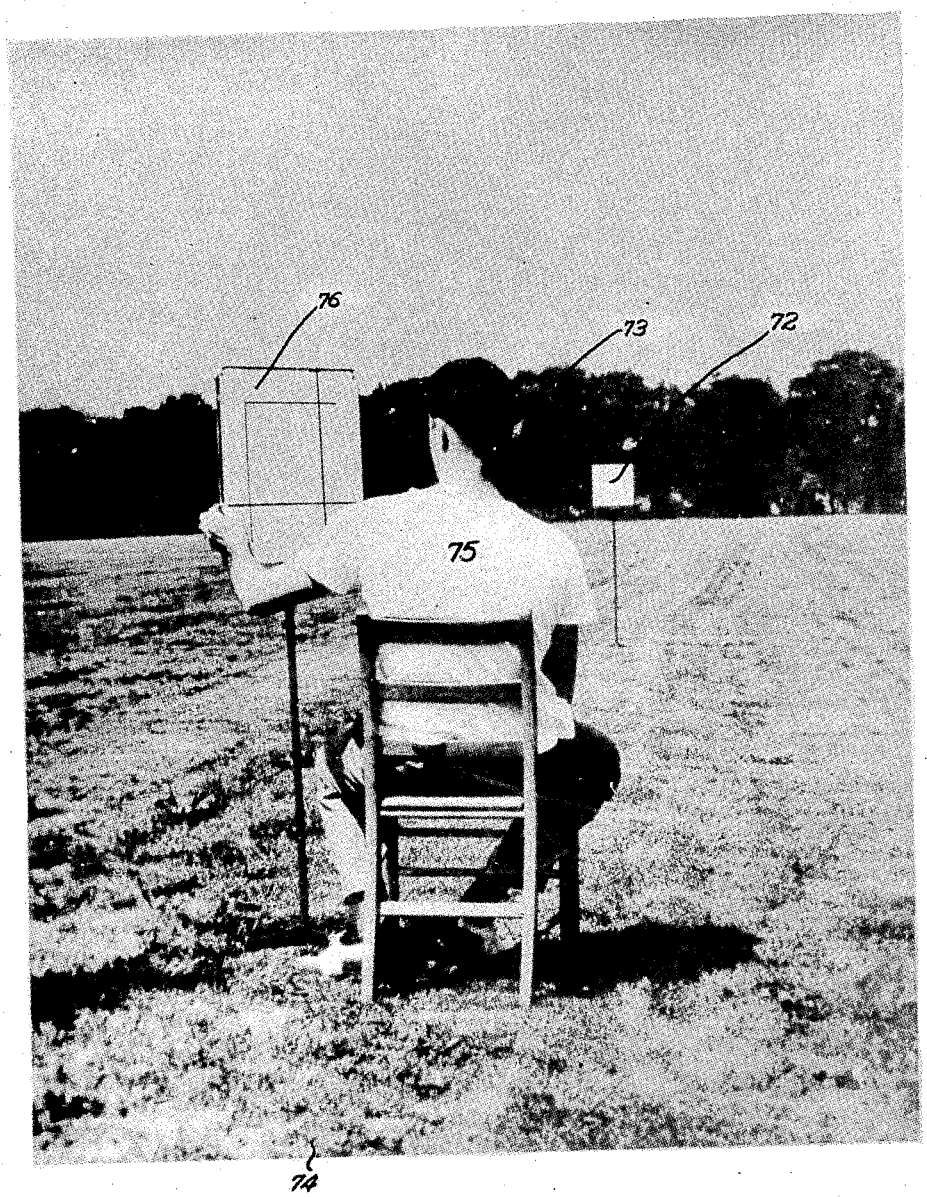
Figure 12 is a photograph which shows a subject in the act of drawing the phenomenal size of a target which can be seen in the background.

The stereoscopic law, based purely upon consideration of geometric optics, is stated as follows:

$$S = \frac{2ab}{x}$$

where $S$ = the magnitude of the stereoscopic difference or the stereo-parallax
$x$ = distance from the eye of the point of fixation
$a$ = distance from the eye of the plane of projection
$2b$ = the interocular distance In order to provide the correct separation of stereo-targets, at a specified distance and viewed through lenses of specified spherical or prismatic power to produce the best possible fusion (i. e. binocular single three-dimensional discrimination), it is necessary to diminish the separation of the two targets as the focal length is changed from the far-point (the principal focus of the lens system) to the near-point (the closest point at which convergence and accommodation relations will permit fusion). The apparatus described herein maintains the correct separation of the two separate stereograms at all viewing distances by means of devices which will be described later. It also provides for the change in separation at any other angle in any relation of one target to the other, thus permitting the control of either or both vertical or horizontal phorias.

The optical principles of the apparatus are illustrated by the diagram shown in Figure 2, to which reference is now made. O and O' represent the optical centers of the stereo-viewing lenses, and Op and O'q the principal axes of these two lenses. The distance O'F is the principal focus of the lenses, with the point F denoting infinity and the point N the near point. K is the septum of any stereoscopic viewer and the line PA is the stereo-axis. From the equation given hereinbefore, it may be shown that if the eyes are emmetropic two similar images at the points p and q in the diagram will be projected upon the retinas in such a position as to produce the opportunity for best possible fusion. When the focal length of the system has been changed so that the stereo-targets are now viewed at position O'N, the points p and q, in order to produce the same effective single binocular vision, must now be moved to positions r, s instead of p' q'. Points on the line Pp and Pq describe the correct positions of similar stereogram points for optical fusion.

The angle $\theta$ in the diagram thus defines the relative correct positions of the targets in terms of any specified lens power of the decentered spheres or prisms. In the original model of this apparatus +5 diopter split spheres of 200 mm. focal length were used. In this case the angle $\theta$ was determined to be 26° 40'. Means is provided so that for lens power of any other focal length, proper adjustment of this angle can be made so as to maintain the appropriate conditions for best possible fusion. Provision is also made so that the targets may be transparencies of any sort or opaque stereograms to be viewed by reflected light.

The improved apparatus and methods which will be described in detail hereinafter, combine a device for measuring stereopsis by the utilization both of geometric optical principles and an objective measure of phenomenal psychological size, form, position and distance relations. It makes possible the determination of the limits within which fusion can be maintained for test objects or targets of different intrinsic design properties. Stereoscopic vision is a dynamic function in which the properties of figure-ground patterning or structuring is an important determinant of the skill possessed by any observer for stereoscopic resolution. Existing stereometric devices make no provision for the measurement of this factor.

The apparatus when used with the psychophysical method of equivalents provides for the measurement of changes in the apparent size of any test object or target which accompany changes in the focal length of the lens system. This may be defined as the combination of the viewing lens or lenses together with those of the observer's own eyes. This is of great importance. Anything which changes the apparent size of a test object changes also the limits of resolution and discrimination of that object. This becomes a principle of first order importance in several measurements, i. e. visual acuity, etc., which are used as the basis for proper corrective lens prescription. The apparatus may be used in conjunction with rotary prisms or other accessory lens devices as an orthoptic instrument for the exercise and training of accommodation, and for the development of stereoscopic skill. It has long been recognized (von Frey) that the perception of depth and distance is not determined by visual factors alone. Proof of this fact is seen in the hundreds of cases of aphakias when cataracts have been surgically removed, thus restoring sight. In all such cases the patient has had to learn to see in the third dimension. There is additional evidence that children below the age of five or six show a normal micropsia. Objects are normally seen smaller than they really are.

However, a good many adult presons may have the same eyesight tendency as children, and in other cases the adults may actually have vision which causes them to see objects much larger than they really are. The same discrepancies as to position and shape of the object may occur in all of these cases.

The apparatus and methods set forth hereinafter provide an instrument for the ophthalmological and optometric determination of the amount and kind of such visual functions and thereby provide an important check upon any prescribed lens correction intended to give more comfortable and effective vision. A measurement with this apparatus and methods made before the fitting of the correction, and another such measurement made after the patient has become accustomed to his new lenses, will reveal the extent to which such correction has accomplished the purpose of providing the closest possible approximation to emmetropic vision. This apparatus and these methods make possible the genetic study of the development of stereopsis from early childhood to adulthood. This apparatus and methods provide a device which may be used by the military establishments of our country for the selection and training of persons suitable to operate binocular devices such as range finders, spotters, gun pointers and the like. The numerical determinations provided by the improved instrument may be employed in connection with appropriate tachistoscopic controlled devices for the control and specification of the time of exposure and the hue saturation and brightness of the incident light. With this addition this apparatus makes it possible to determine the limits within which the reciprocity law operates in stereoscopic vision, and this in turn, permits the specification of the time-size-intensity, distance and figure-ground relations for optimum stereopsis.

General construction

The improved instrument is shown more particularly in Figures 1, 3, 4, 7, 8 and 9. This instrument may conveniently constitute an attachment for any suitable and well known type of binocular arrangement, and in Figure 1 this arrangement has been indicated by the light lines to distinguish the old apparatus from the improved attachment or instrument which is shown in heavy lines. In general, the old binocular structure may comprise a heavy base 1 with an arm 2 pivotally mounted at 3, and having a clamping adjustment indicated at 4. The arm 2 may take the form of a gooseneck, and at its upper end carries a pair of viewing cylinders 5, with appropriate lenses contained in supporting elements indicated at 6. The eye shield 7 may be provided at each side, and also a rest 8 at the middle against which the patient presses his forehead. The improved attachment or instrument is carried on a horizontally extending beam 9, preferably of rectangular section, and made of metal or of any other tough material, such as reinforced plastic and some of the heavy, non-warpable woods.

The beam 9 is secured in any suitable manner to the lower surfaces of the cylinders 5, and extends in general along the median line of the two cylinders considered as a whole. At the end farthest away from the cylinders 5 the beam or rod 9 is provided with a transversely extending arm 10, secured rigidly to the beam, as for example, by means of a portion 11 which is bent upwardly (Figure 1) and tightly embraces the sides of the beam 9. There is a pair of angularly extending bars 12 pivotally mounted, as indicated at 13, on the ends of the arm 10, these bars extending for a considerable distance along the beam 9 and terminating at their farthest ends in tapered portions 14, which aligns their inner edges with the sides of the beam. A tension spring 15 is provided at the ends 14 of the bars 12, this spring serving to bring the ends 14 of the bars together, as can be readily seen in Figure 8.

The bars 12, at their pivots 13, may rest on surfaces 16, countersunk in the upper surface of the arm 10 (Figure 1). There is a screw 17 extending transversely of the bars 12, the screw being supported at the middle by a hollow lug 18 which loosely receives the screw. The latter is threaded at each end, as shown in Figure 8, and the threaded ends are received in threaded apertures formed by the lugs 19 which are secured to the under sides of the bars 12. The screw 17 terminates at one end in a knurled knob 20. The threaded portions of the screws 17 are threaded in opposite directions so that when the knob 20 is turned in one direction the bars 12 may be caused to swing outwardly at their pivots 13 to stretch the spring 15. Thus the angle which the bars 12 make with the beam 9 is correspondingly changed. The knob 20 is also adapted to be rotated in such direction that the bars 12 will swing inwardly, for purposes which will be explained hereinafter.

The beam 9 slidably carries a plate 21, of a general octagonal shape, and provided with a rectangular slotted opening indicated at 22, which fits about the beam 9. The plate 21 is therefore adapted to slide along the length of the beam. This plate supports the stereogram targets or charts, and for this purpose there is provided an upright metal holder 23, constituting a thin metal plate having a downwardly extending U-shaped loop 24 at the top, and provided with a flange 25 at the bottom which is secured to the plate 21 in any suitable manner, for example by rivets 26. A number of diagonally extending brackets 23' (Figure 3) may be employed to maintain the holder 23 in a strictly vertical position. The holder 23 is provided with a pair of rectangular openings 27, spaced apart as shown, and the purpose of which is to admit light from the rear which may be produced by a fluorescent tube 28, extending in the same direction as the holder. The tube 28 may be supported at each end on the brackets 29, secured to the holder as shown in Figure 3, and one of the brackets may contain the necessary contacts for making circuit connections with a pair of electric wires 30 for energizing the tube. It is apparent that when the tube 28 is activated light therefrom will shine through the openings 27 and will render brilliant any transparent or translucent chart, picture or figure which may be placed over the openings 27. In case the chart or figure is not of a self-supporting character it may be desirable to insert a piece of milk or translucent glass between the picture and the opening. The target or picture, of which there are two contained within the holder 23, is indicated at 31, and as will be noted the upper edge of the picture extends to a position underneath the loop 24. The picture or target is usually mounted on a rectangular piece of stiff cardboard which may be either of a translucent or opaque character, as will be described later.

The picture is supported at the bottom of a trough-shaped structure which will now be described. Bearing loosely against the nearer side of the holder 23 there is a pair of horizontally extending thin metal plates 32. These plates are provided with tabs 33 which extend away from the observer (Figure 4) and are adapted to slide in vertical openings 34 which are provided at the four places in the holder 23, two of these positions being at opposite ends of the holder and the other two near the middle of the holder. The purpose of the tabs 33 and the openings 34 is to align the plate 32 in a horizontal direction and to permit the plate to move in a vertical direction, as will be explained presently. The tabs 33 may be provided integral with the plate 32 by merely bending the horizontal tab portion out of line with the remaining portion of the plate. The vertical openings 34 in the holder 23 are bounded by flanges at the upper and lower ends, as indicated at 35, these flanges being conveniently formed by bending small tab-like portions of the holder 23 out of line with the remaining vertical portions of the holder. It is apparent that the plate 32 is constrained to move in a vertical direction through a distance represented by the space between each tab 33 and the adjacent flange 35 (see Figure 6). The plate 32 carries an inverted S-shaped member 36 having a flange 37 which is secured to the plate 32 and terminating at its upper end in a flange 38 (Figure 6), which together with the plate 32, forms a trough extending over the whole length of the plate 32. The picture or diagram 31 rests in this trough-shaped space.

There is a bracket 39 extending through each opening 27 and secured at the end nearer the observer (Figure 4) to the plate 32 by means of rivets 40, or in any other suitable manner. Each of these brackets may be conveniently formed from sheet metal bent into a U-shape to obtain rigidity, and having tapered lower edges as shown in Figure 3, by which to receive an upright boss 41. Each boss is provided with a threaded bore to receive a vertically extending screw 42. The upper end of the screw 42 is provided with thick washers 43, 44, spaced apart to receive the outer end of a bracket 45, and pinned to the screw as indicated at 46. The screw 42 is also provided with a knurled knob 47. The bracket 45 may be of similar construction to the bracket 39 so that the washers 43, 44 can bear against the horizontal flat portion of the bracket. The latter is secured in any suitable manner to the holder 23 so that when the knob 47 is rotated the screw 42 is caused to turn, and inasmuch as the upper portion of the screw is fixed in space, due to the position of the washers 43, 44 and the bracket 45, the boss 41 will be caused to move either upwardly or downwardly, depending on the direction in which the knob is turned. Thus the rotation of the knob 47 will cause the picture or chart 31 to move in the vertical direction, and each of these charts is provided with its own vertical-position adjusting knob 47. The purpose for this vertical adjustment will be explained when the optical properties of the instrument are described.

In case the cards 31 which bear the pictures are of an opaque character so that no light from the fluorescent tube 28 may be projected therethrough, it may be necessary to provide a light source in front of the picture. For this purpose there is provided an upright metal strip 48 secured to the back of the holder 23 (Figure 4), this strip being provided at the upper end with a horizontally bent portion indicated at 49. A holder 50 may be secured to the portion 49, this holder having an opening to receive the base or shank portion of an electric lamp 51 provided with a reflecting shield 52 (Figure 1) for directing light against the front sides of the cards 31 which bear the pictures or charts.

In addition to the vertical adjustment and in accordance with another feature of my invention, the cards 31 are permitted to and in most cases actually are caused to move in the horizontal direction, the arrangement being such that the cards move in opposite directions with respect to one another, i. e. either inwardly or outwardly as may be necessary. This horizontal movement is brought about by means of the following mechanism: Each card is provided at the lower outside edge with at least one vertical opening indicated at 53, of which six such openings have been illustrated. In case more than one opening is provided the openings are preferably equidistantly spaced, and in order to prevent fraying at the edges a thin metal plate may be superposed on each card at the position of the openings, this plate having openings similar to those provided through each card. The purpose of each opening is to provide a grip on the card so as to force the latter either inwardly or outwardly in the horizontal direction, as may be desired. This gripping effect is provided by an upright metal piece 54 having a central groove 55 to leave flanges at the outside, these flanges being provided with aligned threaded openings to receive a thumb screw 56 (Figure 5). This screw passes through one of the openings 53 in a card or chart.

For moving each metal piece 54 there is provided a rectangular bar 57 secured to the under side of the flange 25 and extending from the outer end of the flange as far as the nearest edge of the octagonal plate 21. Each bar 57 is provided with a longitudinally extending slot for slidably receiving a rectangular rod 58 which is screwed at one end, as indicated at 59, to the upright piece 54. A keeper plate 60 is secured to the bottom side of the bar 57 and extends for only a limited length of the bar. The purpose of this plate is to retain the rectangular rod 58 in position. The latter is provided at its inner end with a downwardly extending pin 61, this pin being adapted to slide through the slot in the bar 57 which is left open for a portion of its length by reason of the fact that the length of the plate 60 is considerably less than the length of the bar 57. The pin 61 is of a length sufficient to bear against the outside edges of the bars 12. In order to assure contact between the bar 12 and the pin 61, a tension spring 62 is provided which is connected at one end to the inner side of the metal piece 54 and at the other end to a small projection 63 which extends downwardly from the keeper plate 60. This spring, therefore, urges the metal piece 54 inwardly and in turn causes the rod 58 to move inwardly and therefore the pin 61 to contact the outside edges of the bars 12.

In order to move the plate 21 with respect to the beam 9, there is provided a downwardly extending hand grip member 64 (Figure 3) which is formed integral with the flanges 65 at each side of the plate 21. A transversely extending pin 66 is carried by these flanges, this pin serving as a pivot axis for a lever 67 which has an upwardly extending tooth 68 bearing against the under side of the beam 9. A compression spring 69 is positioned between the grip 64 and the lever 67, this spring serving to urge the tooth 68 against the beam 9 and thus to produce friction at this point sufficient to hold the plate 21 in place on the beam. In operation the fingers embrace the rear side of the grip 64 and the thumb is pressed against the lever 67, then by pushing or pulling the grip 64 the plate 21 can be moved with respect to the beam 9 either toward or away from the user of the instrument. Due to the fact that the pins 61 at both sides of the instrument contact their respective bars 12, any movement of the plate 21 along the beam 9 will cause the cards 31 to move either outwardly or inwardly, depending on the direction in which the plate 21 is moved, and at a rate depending on the angle that the outside edges of the bars 12 make with the central axis of the beam 9.

Consequently there is provided, in accordance with my invention, a simple but effective means by which the cards can be moved in the horizontal direction, either toward or away from one another, and at any desired rate depending on the taper provided by the outside edges of the bars 12. It has been explained that this taper may be adjusted by rotating the knob 20, which in turn causes an adjustment of the rate at which the cards 31 are moved either toward or away from one another as the plate 21 is moved longitudinally of the beam 9. It will now be apparent that the reason for providing more than one opening 53 is to accommodate the instrument to cards 31 of different lengths and thus to assure that the inner edges of the cards do not contact one another prior to the plate 21 having been moved to one of its extreme limits of travel. These openings are of an elongated shape so as to prevent binding at the screw 56 during the vertical movement of the cards. The upper surface of the beam 9 is set off in graduations 70, for purposes which will be described hereinafter and in order to tell at a glance the relative position of the plate 21 with respect to the beam. Stops 71 are secured to the top side of the beam in order to limit the travel of the plate 21. In Figure 1 the plate is shown as abutting the inside surface of one of the stops 71 farthest removed from the lens mechanism 6.

While various forms of pictures, charts or other insignia may be shown on the cards 31 there is illustrated, by way of example, a topographical view which is similar to the field test picture shown in Figure 12 but without the subject. In the picture shown schematically on the cards 31 in Figure 9 reference numeral 72 indicates preferably a white piece of cardboard which is set out in a field and supported above the ground as shown in Figure 12. The vertical lines 73 in Figure 9 schematically indicate the tree background shown in Figure 12, and the horizontal lines 74 schematically illustrate the contour of the field. It will be understood that the pictures shown on the cards 31 (Figure 9) are not exact duplicates but have been obtained by photographing the field, including the cardboard target 72, from a double-lens camera the lenses of which are spaced apart a distance corresponding to the average interocular distance.

Figure 13:
Figure 13 is a view somewhat similar to Figure 12, except that the target has been moved farther away from the subject, necessitating a reduction in the phenomenal area.

In order to calibrate the instrument certain preliminary tests are given a subject 75 (Figure 12), who is assumed to have normal stereoscopic vision. This subject is required to show on a chart 76 his impression of the phenomenal size and shape of the cardboard square 72 that he views in the distance. In Figure 13 the subject 77 is setting out on a chart 78 her impression of the phenomenal area and shape of the cardboard target 79, which has been placed at a greater distance away from the observer than in the case of Figure 12. It will be noted that the rectangle drawn on the chart 76 is larger than the rectangle drawn on the chart 78, due mainly to the different distances that the cardboard targets 72, 79 are placed from the respective observers.

Instead of drawing the phenomenal areas or rectangles shown on charts 76, 78 (Figures 12 and 13), the subject may be requested to observe the distant cardboard targets 72, 79 respectively, and to select from a large number of rectangles, indicated at 80 and drawn on the chart shown in Figure 10, that particular rectangle which he or she believes conforms to the visual impression gained as to the phenomenal sizes of the targets in the field tests. Thus a subject may decide that one rectangle shown in Figure 10 is too large and another rectangle is too small, and in that way make an intelligent selection. One of the rectangles shown in Figure 10 is considered to have the proper phenomenal area when a cardboard target 72 or 79 has been viewed by a subject of normal stereoscopic vision and the target placed at a predetermined distance from the observer. Consequently, visual conditions existing in the field can be reproduced in the laboratory by employing phenomenal areas. In other words, a subject, viewing each target 72 (Figure 9) on the charts 31 and looking through the pieces 6 (Figure 1), will gain the same impression as to the phenomenal area of the target as he would obtain if he were actually out in the field, assuming that he had normal stereoscopic vision. However, a patient may have normal binocular vision with respect to an object placed at a predetermined distance from the observer, but when the object is either moved farther away or closer to the observer the patient's stereoscopic vision would not be normal. It is therefore necessary to test his tri-dimensional vision throughout a distance range as applied to the instrument from the so-called "near-point" to the optical infinity point. This adjustment is made by moving the picture holder 23 either toward or away from the observer who looks through the lens pieces 6, and by noting the corresponding field distances obtained from the graduations 70, the observer's eyes are tested throughout the desired range of distance. It has been pointed out that the cards 31 on which the pictures are mounted will move toward one another at a predetermined rate as the plate 21 is moved toward the eye-pieces 6. The reason for causing the pictures to converge as the distance between the pictures and the observer is made less was explained at length in connection with the optical diagram shown in Figure 2. The vertical movement of the cards 31 effected at the knobs 47 allows for any prismatic imbalance of the patient's eyes in the vertical direction.

Referring now to Figure 11, the curve $a$ represents the plot of certain determinations found as a result of field tests on the binocular vision of a subject or patient, and curve $b$ represents corresponding determinations resulting from tests performed on the same subject or patient when employing the improved instrument. These curves have been plotted against the logarithm of the phenomenal area as the ordinate and the logarithm of the distance of the viewed object in meters. The various points marked $c$ on the curve $a$ were obtained by moving the target 72 (Figure 12) from the observer 75 throughout specified distances along the field 74, and directing the observer to give his impression of the size of the target at the various distances and as seen from the observer's position. In determining the curve $b$ the same observer or subject is then requested to give his impression of the size of the phenomenal area of the cardboard targets seen through the eye-pieces 6 at positions of the plate 21 which would correspond to the various field distances of the curve $a$, and taking into account the magnifying power of the lenses. The distance measurements for plotting the instrument curve $b$ are read directly from the graduations 70, since the movement of the plate 21 away from the observer serves to give the same optical effect in the laboratory as would take place if the target were actually moved through predetermined distances over the terrain.

It will be noted that the points obtained on curve $b$ are considerably less than the corresponding points obtained as the result of the field tests, and in order that the points on curve $b$ shall conform to those actually obtained in the field, these points must be corrected by a certain factor which is expressed as a mathematical equation. For example, the equation of a twenty-nine year old male emmetrope is $$F = .22\,S + 4.26$$

in which $F$ is the logarithm function of the relation of the logarithm of distance of the test object to the logarithm of the phenomenal area, and $S$ represents the same relations for the same scene reproduced in stereo-photograph and viewed through the apparatus herein described. In other words, every twenty-nine year old male, having normal stereoscopic vision, which vision has been determined by the improved instrument and represented by the curve $b$ may have his instrumentality measured binocular vision translated into actual field conditions by the use of the above noted formula. It is apparent that only those persons having normal stereo-vision will show a visual index which conforms exactly to curve $b$, and the variations in this index, as translated to the field conditions, will tell accurately the exact condition of the patient's eyes from the stereoscopic vision standpoint.

As an example of another equation which may be required to translate the instrument determinations expressed by the curve $b$ into corresponding field determinations as expressed by the curve $a$, take the case of a forty-nine year old male presbyope, this patient wearing the following lens correction:

Rx
Dist.
  R: +.75 −1.00 × 105
  L: +.75 −1.00 × 80
Add
  R: +1.50
  L: +1.50

The stereo-factor in this case is $F=.09S+4.56$, which is exactly two and one-half times the correction factor given in the previous case. Thus the improved instrument and methods are sufficiently sensitive to reveal differences in the stereo-efficiency of individuals of varying ages and ocular conditions. These differences take into account the so-called "psychic convergence error" so that this error can be measured and therefore controlled.

The quoted term refers to the fact that the mere awareness by an observer that he is looking into an optical instrument of limited space compass prohibits the effective simulation of such factors as size and distance by means of such apparatus. This is a criticism of most existing stereometric devices. However, by the use of the improved instrument it can be predicted with great accuracy in the office or laboratory from the results obtained thereby, the sizes and distances phenomenally seen by an observer under real life conditions in the field without any visual adjuncts. This is very important because the improved instrument enables the ophthamologist or optometrist to determine by simple and convenient mean facts about a patient's vision, with or without correction, which could only be accomplished at great expense of time and labor under field conditions.

The equations of the lines F and S (see definitions given hereinbefore) being linear functions are $y=mx+b$, where $x$ is the length of the abscissa and $y$ is the length of the ordinate. The letters $m$ and $b$ designate constants. But $$m=\frac{y-b}{x}$$

and is equivalent to the tangent of the angle $\theta$. Applicant lists below the successive log values of S and F and their first differences in the following table:

| ΔS | S | F | ΔF |
|---|---|---|---|
|  | 3.46 | 5.02 |  |
| .50 |  |  | .11 |
|  | 2.96 | 4.91 |  |
| .34 |  |  | .08 |
|  | 2.62 | 4.83 |  |
| .29 |  |  | .06 |
|  | 2.33 | 4.77 |  |
| .33 |  |  | .07 |
|  | 2.00 | 4.70 |  |

This table shows the obtained values in terms of log area for S and F. ΔS is the difference between the first two entries under S, i. e.

$$3.46-2.96=.50$$

and $2.96-2.62=.34$, etc. Since these differences are log differences and are approximately linear they may be represented by the equation $y=mx+b$. If we solve for $m$ and $b$, F can be substituted for $y$ and S for $x$ and then there is obtained $F=K'S+C$, where F is the log area of the matching far judgment; S is the judgment of the stereo-area seen through the instrument and C is a constant. From the data of the above table we may write $$F=mS+b$$

Solving for $m$ $5.02=3.46m+b$
  $4.91=2.96m+b$

Subtracting   $.11=.50m$ and $$m=.22$$

Solving for $b$:

$F=.22S+b$
  $5.02=.22(3.46)+b$
  $5.02=.76+b$
  $b=4.26$

Substituting for $m$ and $b$ $F=.22S+4.26$
  $S=\dfrac{F-4.26}{.22}$

Equation $F=.22S+4.26$ indicates that for this individual, if the phenomenal stereo-area is multiplied by .22 adding to this product 4.26, the logarithm of the matching area is obtained. Since the points defining the line $a$ in Figure 11 were actually made in the field, and since the equation enables applicant to transform the stereo-data into the field data with satisfactory accuracy, it is justifiable to make the previous assertion with regard to the feasibility of this method of transforming stereo-measurements into the expected field measurements.

In addition to the field and stereo-curves $a$ and $b$, Figure 11 also shows, in light dot-dash lines, curves $d$ and $e$ which represent characteristics conforming to the so-called "Emmert's Law," and based on the mathematical considerations discussed hereinbefore. It will be noted that curves $a$ and $b$ do not conform to the results which should have been obtained according to Emmert's Law, and as a matter of fact my determinations have shown that Emmert's Law could not possibly hold. This law states that the projection area of an object varies inversely as the second power of the distance. If the same object is seen at twice the distance, it should appear one-fourth as large. Generally far objects are seen too large, and near objects are seen too small. This is the principle which Thouless has called "phenomenal regression to reality." It is also known as the principle of size-constancy. The apparent size of any object depends, therefore, not only upon its distance from the eye but also upon a set of laws relating to its background surroundings.

The curves $a$ and $b$ which were obtained by actual field and instrument test, conclusively show that Emmert's Law, as pertaining to the subject of stereo-vision, does not hold. Some of the devices of the prior art operate on the principles enunciated by this law and for that reason do not give a correct determination or diagnosis of a patient's eyes considered from the stereopsis standpoint. On the other hand, the principles incorporated in the improved instrument which for convenience may be termed a "stereo-disparator," are based on both actual field tests under carefully controlled and ideal conditions and determinations obtained in a laboratory employing an accurate instrument of the type described.

It is apparent that the angles which the bars 12 make with the beam 9 may have to be changed to accommodate changes in the focal lengths of the lenses inserted at the eye-pieces 6 (Figure 1). This change in angularity, in effect, compensates for the smaller angles subtended by the more distant objects in the field as translated into a corresponding increased distance effect provided by the optical system of the instrument. It will be understood that the distance effects as viewed by an observer in the field may be simulated by providing the correct focusing lenses at the eye-pieces 6 of the instrument. The adjustment at the knob 20 by which the bars 12 are either moved outwardly or inwardly about their pivots 13 provides the necessary change in rate of movement of the charts 31, either inwardly or outwardly, to correspond with the change in the subtended angle as the observed object is moved either toward or away from the observer.

While I have described the improved stereo-disparator from the standpoint of diagnosing the stereovision of a patient to simulate actual field tests, it will be understood that the instrument may also be employed to advantage to develop fusional skill and sharp focusing in the various horizons. When the device is employed for training purposes, and assuming the proper prismatic lenses have been installed in the eye-pieces 6 in order to obtain true accommodation, the plate 21, including the picture holder, is first moved to a position at which the patient can readily fuse the two images shown on the charts as a single tri-dimensional image. The plate 21 is then moved either forward or backward until the images become either blurred or separated, showing that the patient does not have the correct stereo-vision at the field distances corresponding to the optical distances of the instrument. The plate 21 is then moved to its initial position, after which it is again moved to its second position and if this process is repeated a number of times, assuming that the eyes have no organic defects, the stereo-vision of the patient will have improved at least to such an extent that he will be able completely to fuse the two images at the second position as well as he did at the first position of the plate.

The plate is then moved to a position such that the depth perception effects are again lost, then alternately moving the plate to one of the positions at which the stereo-vision is apparent. All of these steps are repeated, moving the plate 21 back and forth until it moves just out of the range of the patient's stereo-vision capability, and then restoring the plate to the patient's stereo-vision position, and it will be found after continued practice that the patient will have established binocular vision throughout the entire field distance as simulated by the optical system of the instrument. This training method may also be applied to the vertical movements of the respective charts until the ocular imbalance or excess phorias in the vertical direction have been eliminated. If it is assumed that the instrument curve b represents the normal stereo or binocular vision of a subject, any deviation from this curve at any point would represent a correction which must be added to the other optical correction factors at the lenses in order that the stereo-vision of that subject will conform to the standard curve b. These corrections may be set out in any suitable manner as a prescription similar to the prescriptions in the case of ordinary eye diagnoses. The corrective factors shown by the instrument to be necessary in providing normal stereo-vision may, if desired, be combined with other corrective factors so that suitable lenses may be prescribed to give the proper combined magnifying and stereoscopic power to the eyes of the subject under test.

From the foregoing it is evident that I have disclosed an improved instrument and methods of operating the same which are capable of revealing to the ophthamologist and the optometrist anomalies of near-point and far-point vision not possible with any known optical device. The improved stereo-disparator has been operated under practical conditions and has been found to give extremely accurate diagnosis of the stereo or tri-dimensional vision of a patient. While I have described the invention more particularly on the basis of comparing phenomenal areas of a target, it will be understood that other discriminating characteristics from which comparisons may be made in determining the shapes and positions of the curves a and b (Figure 11) can be employed for measuring stereopsis. For example, I may utilize to advantage an objective measure of phenomenal psychological size (as distinguished from area), form, position and distance relations.

It will be understood that I desire to comprehend within my invention such modifications as come within the scope of the claims and the invention.

Having thus fully described my invention, what I claim as new and desire to secure by Letters Patent, is:

1. A device for testing binocular vision comprising an attachment for a standard optical instrument, said attachment including a support on which is slidably mounted a picture holder carrying a pair of spaced pictures, said pictures representing the stereoscopic complements of one another and adapted to be viewed through said optical instrument, and means on the support coacting with said holder and said pictures for automatically and simultaneously moving said pictures with respect to one another when said holder is moved along said support, said last-named means including means for moving the pictures longitudinally of the line of sight and for simultaneously moving them transversely away from or toward each other as they are moved respectively away from or toward the viewer in a longitudinal direction.

2. A device for testing binocular vision comprising an attachment for a standard optical instrument, said attachment including a support on which is slidably mounted a picture holder carrying a pair of spaced pictures, said pictures representing the stereoscopic complements of one another and adapted to be viewed through said optical instrument, and means on the support coacting with said holder and said pictures for automatically moving said pictures with respect to one another when said holder is moved along said support, said last-named means including means for moving the pictures longitudinally of the line of sight and for simultaneously moving them transversely away from or toward each other as they are moved respectively away from or toward the viewer in a longitudinal direction.

3. A device for testing binocular vision comprising a binocular lens structure adapted to be focused and carried on a support which extends along the line of sight, a pair of spaced stereoscopic pictures, a holder carrying said pictures and slidably mounted on said support, said pictures adapted to be fused into a single image when viewed through said lens structure, said pictures being movable as a unit along said line of sight, means on the support coacting with said holder and said pictures for automatically moving said pictures with respect to one another as the picture unit is moved along the line of sight, said last-named means including means for moving the pictures longitudinally of the line of sight and for simultaneously moving them transversely away from or toward each other as they are moved respectively away from or toward the viewer in a longitudinal direction.

4. A device for testing binocular vision comprising a pair of lenses spaced apart the normal interocular distance, a picture holder positioned in front of said lenses and movable with respect thereto, said holder containing a pair of spaced pictures which are the binocular complement of one another and adapted to be viewed stereoscopically through said lenses, means on the support coacting with said holder and said pictures for changing the spacing between the pictures as the holder is moved with respect to the lenses, said means comprising a guideway on said device, and a guide on at least one of said pictures which cooperates with said guideway for simultaneously moving the pictures away from or toward each other as they are moved respectively away from or toward the viewer in a longitudinal direction.

5. A device for testing binocular vision comprising a pair of lenses spaced apart the normal interocular distance, a picture holder positioned in front of said lenses and movable with respect thereto, said holder containing a pair of spaced pictures which are the binocular complement of one another and adapted to be viewed stereoscopically through said lenses, means on the support coacting with said holder and said pictures for changing the spacing between the pictures as the holder is moved with respect to the lenses, said means comprising a guideway on said device, and a guide on at least one of said pictures which cooperates with said guideway for simultaneously moving the pictures away from or toward each other as they are moved respectively away from or toward the viewer in a longitudinal direction, said guideway being positioned at an angle with respect to the median line of sight of said lenses.

6. A device for testing binocular vision comprising a pair of lenses spaced apart the normal interocular distance, a picture holder positioned in front of said lenses and movable with respect thereto, said holder containing a pair of spaced pictures positioned in a single plane and which are the binocular complement of one another and adapted to be viewed stereoscopically through said lenses, means coacting with said holder for changing the spacing between the pictures as the holder is moved with respect to the lenses, said means comprising a pair of guideways on opposite sides of the median line of sight of said lenses, and guides on said pictures which bear respectively against said guideways to cause the pictures to recede from one another while maintaining their planar relation as the picture holder is moved away from said lenses.

7. A device for testing binocular vision comprising a pair of lenses spaced apart the normal interocular distance, a picture holder positioned in front of said lenses and movable with respect thereto, said holder containing a pair of spaced pictures positioned in a single plane and which are the binocular complement of one another and adapted to be viewed stereoscopically through said lenses, means coacting with said holder for changing the spacing between the pictures as the holder is moved with respect to the lenses, said means comprising a pair of guideways on opposite sides of the median line of sight of said lenses, and guides on said pictures which bear respectively against said guideways to cause the pictures to recede from one another while maintaining their planar relation as the picture holder is moved away from said lenses, said guideways extending away from one another as viewed from said lenses whereby the pictures are caused to approach one another as the distance from said lens to said pictures is decreased.

8. A device for testing binocular vision comprising a support which extends along the viewing direction, a picture holder slidably mounted on said support, a pair of spaced pictures movably mounted on said holder, said support having a tapered guideway at each side thereof, a pair of pins adapted slidably to engage said guideway and means connecting each pin to a picture whereby the pictures are moved longitudinally of the line of sight and simultaneously moved transversely away from or toward each other as they are moved respectively away from or toward the viewer in a longitudinal direction.

9. A device for testing binocular vision comprising a support which extends along the viewing direction, a picture holder slidably mounted on said support, a pair of spaced pictures movably mounted on said holder, and an opening in each picture, said support having a tapered guideway at each side thereof, a pair of pins adapted slidably to engage said guideway, a pair of bars, means slidably supporting said bars, each pin being mounted on a bar, means connecting each bar to a picture whereby the pictures are moved longitudinally of the line of sight and simultaneously moved transversely away from or toward each other as they are moved respectively away from or toward the viewer in a longitudinal direction.

10. A device for testing binocular vision comprising an attachment for an optical instrument, said attachment including a support on which is slidably mounted a picture holder, a picture mounted in said picture holder, a cradle for each of said pictures, said cradle being mounted on said picture holder and adapted to move in a vertical direction with respect thereto, means including a screw accessory for elevating the cradle whereby the picture is moved in a vertical direction, and means including a tapered guideway secured to said support, means engaging said guideway and attached to a picture whereby the pictures are moved longitudinally of the line of sight and simultaneously moved transversely away from or toward each other as they are moved respectively away from or toward the viewer in a longitudinal direction.

11. A device for testing binocular vision comprising an attachment for an optical instrument, said attachment including a support on which is mounted a picture holder, a pair of spaced pictures movably mounted on said holder, said support having a pair of bars at each side thereof, said bars forming a triangular shape the base of which is positioned remote from the optical instrument, guides secured respectively to said pictures and so arranged that they will contact the guiding surfaces of said bars whereby as the holder is moved with respect to the optical instrument the pictures are caused to recede or approach one another depending on the direction in which the picture holder is moved, and means for adjusting the angle with which said bars extend with respect to said support.

12. A device for testing binocular vision comprising an attachment for an optical instrument, said attachment including a support on which is mounted a picture holder, a pair of spaced pictures movably mounted on said holder, said support having a pair of bars at each side thereof, said bars forming a triangular shape the base of which is positioned remote from the optical instrument, guides secured respectively to said pictures and so arranged that they will contact the guiding surfaces of said bars whereby as the holder is moved with respect to the optical instrument the pictures are caused to recede or approach one another depending on the direction in which the picture holder is moved, and means for adjusting the angle with which said bars extend with respect to said support, said means comprising a rod spanning said bars and extending in the same direction as the triangular base formed by the bars, said rod having oppositely threaded portions which engage projections on said bars and cause the latter to move either outwardly or inwardly with respect to one another and thereby change the angle which the bars make with said support.

13. A device for testing binocular vision comprising an attachment for an optical instrument, said attachment including a support on which is slidably mounted a picture holder carrying a pair of spaced pictures, said pictures representing the stereoscopic complement of one another and adapted to be viewed through said optical instrument, means for moving said pictures with respect to one another when said holder is moved along said support, said means comprising a pair of bars positioned on opposite sides of said support and extending angularly with respect to said support, said bars being pivotally mounted at the base of the formed triangle on a support and being spaced apart at the apex of the formed triangle by a tension spring, and means for adjusting the angularity of the bars with respect to said support, said last-mentioned means comprising a rod having oppositely threaded portions which are received by projections on said bars, the arrangement being such that as the rod is rotated in either direction the bars are caused to swing about their pivots thus to change the angularity of the bars with respect to said support.

14. A device for testing binocular vision comprising an attachment for an optical instrument, said attachment including a support on which is slidably mounted a picture holder carrying a pair of spaced pictures, said pictures representing the stereoscopic complement of one another and adapted to be viewed through said optical instrument, means for moving said pictures with respect to one another when said holder is moved along said support, said means comprising a pair of bars positioned on opposite sides of said support and extending angularly with respect to said support, said bars being pivotally mounted at the base of the formed triangle on a support and being spaced apart at the apex of the formed triangle by a tension spring, means for adjusting the angularity of the bars with respect to said support, said last-mentioned means comprising a rod having oppositely threaded portions which are received by projections on said bars, the arrangement being such that as the rod is rotated in either direction the bars are caused to swing about their pivots thus to change the angularity of the bars with respect to said support, and pins bearing along the outer surfaces of said bars, said pins being connected to said pictures whereby as the picture holder is moved along its support the pictures are caused to recede from or approach one another depending on the direction in which the picture holder is moved and at a rate determined by the angularity given said bars due to the position of said rod.

15. A device for testing depth perception comprising a lens viewing piece carried on a support which extends along the line of sight of said lens, a carriage slidably mounted on said support and carrying a picture holder, a pair of spaced stereoscopic pictures in the holder, said holder being provided with a trough-shaped support at the lower edge on which the picture is mounted and also being provided with a looped upper edge to support the picture in the vertical plane, the interior width of said picture holder being greater than the width of the pictures, and means coacting with said holder and with said picture for moving the pictures independently of one another within the holder, said last-named means including means for moving the pictures longitudinally of the line of sight and for simultaneously moving them transversely away from or toward each other as they are moved respectively away from or toward the viewer in a longitudinal direction.

SAMUEL RENSHAW.